United States Patent [19]

Hosaka et al.

[11] 4,129,337

[45] Dec. 12, 1978

[54] METHOD FOR PREVENTING EROSION-CORROSION OF HYDRAULIC CAPSULE TRANSPORTATION APPARATUS

[75] Inventors: Nobuyoshi Hosaka; Yuichi Ishikawa, both of Ibaraki; Osamu Nishida, Saitama; Masakatsu Sakamoto, Matsudo, all of Japan

[73] Assignee: Hitachi, Ltd., Japan

[21] Appl. No.: 703,236

[22] Filed: Jul. 7, 1976

[30] Foreign Application Priority Data

Jul. 9, 1975 [JP] Japan ................................. 50-83482

[51] Int. Cl.$^2$ ............................................. B65G 51/04
[52] U.S. Cl. ..................................... 302/2 R; 302/14; 302/66
[58] Field of Search ....................... 243/38, 39; 302/14, 302/2 R, 66; 21/2.7 R

[56] References Cited

U.S. PATENT DOCUMENTS

| 2,449,962 | 9/1948 | Wachter | 21/2.7 R |
| 2,556,387 | 6/1951 | Ayers | 21/2.7 R |
| 3,312,506 | 4/1967 | Baker | 302/66 |
| 3,333,901 | 6/1967 | Hodgson et al. | 302/14 |
| 3,961,639 | 6/1976 | Chang | 302/66 X |

Primary Examiner—Sam Silverberg
Attorney, Agent, or Firm—Craig & Antonelli

[57] ABSTRACT

To prevent erosion-corrosion of capsules moving by means of a fluid through a pipe line, straight chain, macromolecular materials are deposited on the surfaces of capsules before introduction into the pipe line, a corrosion inhibitor is added to the fluid, and said corrosion inhibitor of higher concentration is deposited to the capsules before a temporary exposure to the atmosphere.

11 Claims, 4 Drawing Figures

METHOD FOR PREVENTING EROSION-CORROSION OF HYDRAULIC CAPSULE TRANSPORTATION APPARATUS

The present invention relates to a method for preventing erosion-corrosion of inner walls of a hydraulic capsule transportation apparatus capable of transporting metallic capsules introduced into a pipe line, by means of a fluid flowing through the pipe line, and also for preventing erosion-corrosion of capsule surfaces.

To prevent corrosion of inner walls of a pipe line caused by a fluid flowing through the pipe line, for example, a method for adding a corrosion inhibitor to the fluid has been so far proposed. The corrosion inhibitor includes an inhibitor capable of oxidizing the inside wall surfaces of a pipe to form a stable oxide film, an inhibitor capable of oxidizing the inside wall surfaces of a pipe and at the same time forming a dense precipitate layer on the wall surfaces, an inhibitor capable of being adsorbed onto the inside wall surfaces of a pipe to coat the wall surfaces and inhibit the corrosion, etc. However, all of these inhibitors contain chromates, polyphoshates, etc., and have the following drawbacks. That is, when a fluid containing such corrosion inhibitors is discharged, for example, to a river as a waste, the fluid pollutes the river, and also much expense is required for its purification. The polyphosphate also has the similar drawbacks. The film formed by said inhibitor is readily peeled off from the inside wall surfaces of pipe through contact with capsules, the peeled parts are oxidized by an oxidizing action of the inhibitor to form a film again, the film thus formed is peeled off again, and such steps are repeated. As a result, corrosion of the pipe proceeds. The peeled-off oxide films, if they exist in a large amount in the pipe line, will cause to wear the inside wall surfaces of the pipe and the capsules.

An object of the present invention is to prevent erosion and corrosion of inside wall surfaces of pipe line in a hydraulic capsule transportation apparatus for transporting metallic capsules, introduced into the pipe line, by means of a fluid flowing through the pipe line, and also prevent erosion-corrosion of the surfaces of the capsules.

According to the present invention, straight chain macromolecular materials are deposited onto surfaces of capsules to be introduced into a fluid flowing through a pipe line, thereby reducing a fluid resistance of capsules and at the same time reducing damages due to contact of the capsules with the inside walls of pipe line, and a corrosion inhibitor containing an inorganic nitrite and dicyclohexylammonium nitrite or hexamethylene-tetramine is added to the fluid flowing through the pipe line, thereby preventing the inside wall surface of the pipe line and the surfaces of the capsules, and after capsules have discharged material to be transferred (content) said corrosion inhibitor is deposited onto the surfaces of the capsules before exposure to the atmosphere, thereby preventing the corrosion of capsules in the atmosphere.

Now, the present invention will be described in detail, referring to the accompanying drawings.

At first, the outline of the present method for preventing the corrosion is described below:

The present erosion-corrosion prevention consists of two treatments. The one is to deposit a material capable of reducing a fluid resistance onto surfaces of capsules to reduce the resistance of the fluid to the capsules, and the other is to add a corrosion inhibitor to the fluid and also deposit the corrosion inhibitor at a higher concentration than that of the corrosion inhibitor added to the fluid onto the surfaces of capsules after the capsules have discharged a material to be transported, thereby preventing the capsules from corrosion when exposed to the atmosphere for a short time.

Figure 1:
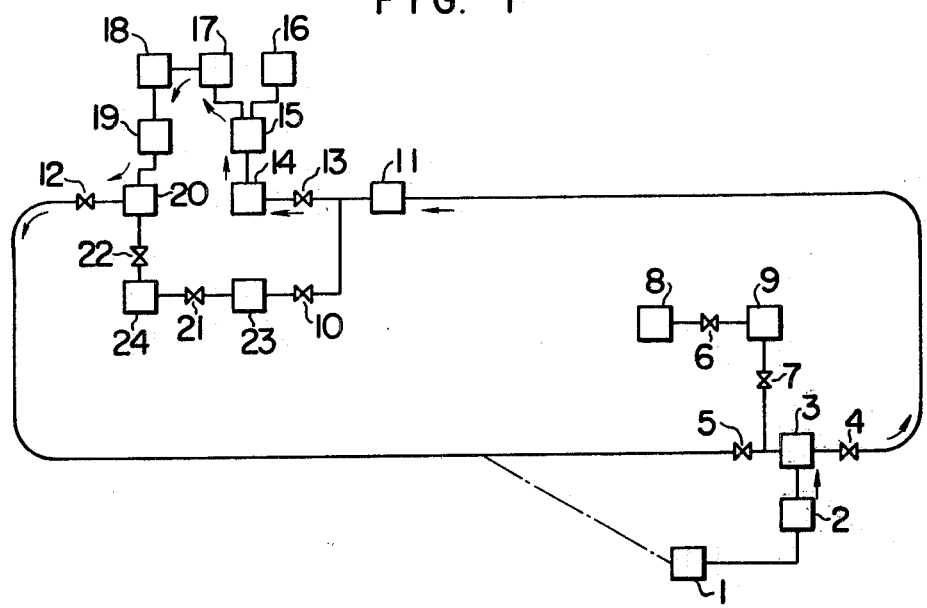
FIG. 1 is a block diagram, where the present method for preventing corrosion of a hydraulic capsule transportation apparatus is applied.

An example of the present method will be described, referring to FIG. 1, where a hydraulic capsule transportation apparatus comprises a collector-distributor 1, a surface-treating liquid tank 2, an injector 3, valves 4, 5, 6, 7, a pit 8, a pump 9, a detector 11, valves 10, 12, 13, a receiving chamber 14, an opener 15, a storage tank 16, a corrosion-prevention treatment tank 17, a storage house 18, a surface-treating liquid tank 19, an injector 20, valves 21, 22, a pit 23 and a pump 24.

One embodiment of the present method is carried out in FIG. 1 in the following manner.

Capsules filled with a material to be transported by means of a filling device (not shown in the drawing) are led to collector-distributor 1 and further to surface-treating liquid tank 2, where a material capable of reducing a fluid resistance is deposited onto the surfaces of the capsules by injecting, spraying or brushing the material onto the surfaces of the capsules, or passing the capsules through the tank filled with the material. After the surface treatment, the capsules are led to injector 3, and valves 4, 5 are closed, while valves 6, 7 are opened, and a fluid stored in pit 8 is introduced into injector 3 by means of pump 9. Then, valves 4, 10 are opened, and the capsules move in the arrowed direction. When the capsules pass through detector 11, valves 10, 12 are closed, while valve 13 is opened. The capsules reach capsule receiving chamber 14, and then are led to capsule opener 15, where the material to be transported is discharged from the capsules. The discharged material is separately transported to storage tank 16 by means of a belt conveyor (not shown in the drawing).

The empty capsules are led to corrosion-prevention-treating tank 17, where the capsules are exposed to the atmosphere for a short time, that is, a period from charging the material to be transported to recirculation to collector-distributor 1, and thus there is a possibility of causing atmospheric corrosion of the capsules. To prevent such possibility of corrosion, a solution of corrosion inhibitor having a higher concentration to ensure an atmospheric corrosion prevention of the capsules than the pipe line fluid is deposited to the surfaces of the capsules by injection, spraying, brushing or passing through the tank filled with the inhibitor in the manner similar to the treatment in said surface-treating liquid tank 2. After the corrosion prevention treatment, the surface-treated capsules are led to storage house 18, and stored for a short time as described above; after the storage, the capsules are taken out of the storage house, led to a surface-treating liquid tank 19 where the surfaces of the capsules are treated in a manner similar to the surface treatment in said surface-treating liquid tank 2, that is, the surfaces of the capsules are deposited with the material capable of reducing the fluid resistance. Then, the treated capsules are led to injector 20, valves 21, 22 are opened, and the fluid in pit 23 is introduced into injector 20 by means of pump 24. At the same time, valve 12 is opened, and the capsules move in the arrowed direction. One cycle of the capsule movement is then completed, and the transportation of the material to be transported is also completed. Then, the capsules are led to the filling device for the material to be transported, and filled with the material and then led to collector-distributor 1.

As the material capable of reducing the fluid resistance, straight chain, macromolecular materials such as polyethylene oxide having a molecular weight larger than $10^4$ are used. Preferable concentration of an aqueous solution of the macromolecular materials is 0.1 to 10% by weight, and less effect is obtained below 0.1% by weight. Above 10% by weight, the macromolecular materials are dissolved out from the surfaces of the capsules in the fluid, and cause to increase the viscous resistance of the fluid. Thus, there are a fear of adverse effect, and also an economical disadvantage.

As the corrosion inhibitor, inorganic nitrite and dicyclohexylammonium nitrite or hexamethylene tetramine are used. The corrosion inhibitor is added to the fluid, as already described above, to prevent the inside wall surfaces of pipes and the surfaces of capsules from corrosion, and further to prevent the surfaces of capsules from corrosion by deposition thereon, when the capsules are exposed to the atmosphere. The preferable amount of the corrosion inhibitor in a mixture of the inorganic nitrite and dicyclohexylammonium nitrite or hexamethylene tetramine at a ratio of the former to the latter of approximately 3:2 is 0.015 to 1.5% by weight on the basis of the fluid. If the amount is below 0.015% by weight, a corrosion prevention film of insufficient structure is formed, and a good effect upon corrosion prevention cannot be expected. On the other hand, insoluble matters remain in the fluid above 1.5% by weight, increasing the fluid resistance of capsules and bringing about an economical disadvantage. In the case of deposition of the corrosion inhibitor onto the surfaces of the capsules for the exposure to the atmosphere, it is desirable to use the corrosion inhibitor of the mixing ratio of approximately 1:4 at a concentration of above 1.5% by weight.

EXAMPLE

Figure 2:
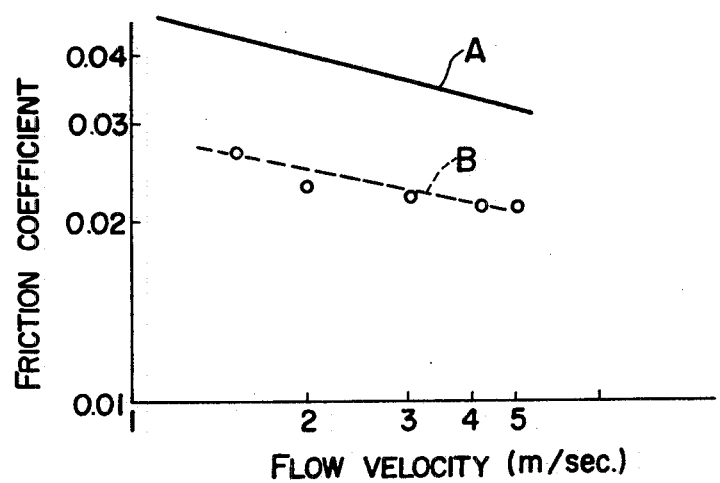
FIG. 2 is a graph showing relations between a fluid flow velocity and a friction coefficient between pipe and capsules, when a material capable of reducing a fluid resistance is deposited onto the surfaces of capsules.

Effect of deposition of polyethylene oxide as the material capable of reducing a fluid resistance onto the surfaces of carbon steel capsules is determined in respect to reduction in the friction coefficient between the capsules and the pipe, and the results are shown in FIG. 2, where a full line A shows the friction coefficient when no material capable of reducing the fluid resistance is deposited onto the surfaces of capsules, and a dotted line B the friction coefficient when the material at a concentration of 1% by weight is deposited onto the surfaces of capsules. The fluid flowing through the pipe is unused water for industrial purpose. It is seen from FIG. 2 that a good effect can be obtained by the deposition of the material onto the surfaces of capsules.

Effects of a corrosion inhibitor upon the corrosion prevention are determined with the following two compositions, that is, composition 1 for the addition to the fluid and composition 2 for the corrosion prevention of capsules in the atmosphere.

| Composition 1 | % by weight |
|---|---|
| Sodium nitrite | 30 |
| Dicyclohexylammonium nitrite | 20 |
| Benzoic acid | 30 |
| Monosodium hydrogen phosphate (NaH$_2$PO$_4$) | 10 |
| Bisodium hydrogen phosphate (Na$_2$HPO$_4$) | 10 |
| Composition 2 | |
| Sodium nitrite | 10 |
| Dicyclohexylammonium nitrite | 40 |
| Benzoic acid | 30 |
| Monosodium hydrogen phosphate (NaH$_2$PO$_4$) | 10 |
| Bisodium hydrogen phosphate (Na$_2$HPO$_4$) | 10 |

In said compositions, benzoic acid, monosodium hydrogen phosphate and bi-sodium hydrogen phosphate are used to adjust pH of the fluid.

Figure 3:
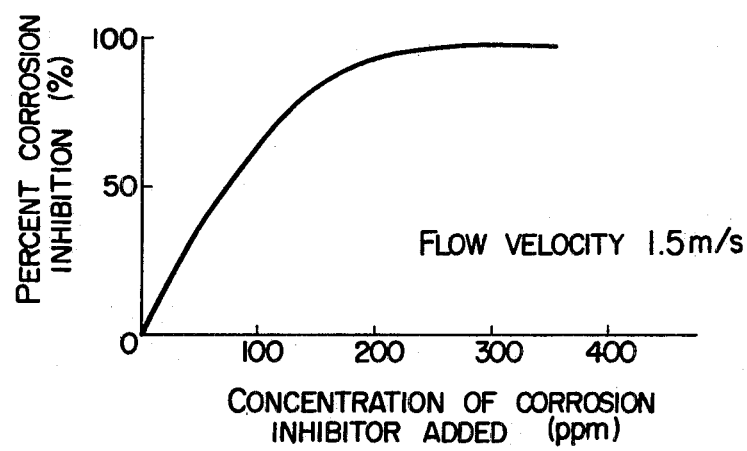
FIG. 3 is a graph showing an effect of corrosion prevention on the inside wall surfaces of pipe.

Relations between the amount of the corrosion inhibitor of composition 1 added to untreated, unused water for industrial purpose and the percent corrosion inhibition are shown in FIG. 3. The percent corrosion inhibition is determined as follows. 30 cm-long, carbon steel pipes for test purpose are placed at four positions of pipe line straight part and bent part of the pipe line and the fluid is made to run through the pipe at a flow velocity of 1.5 m/sec for 100 days, and the reduced weights of the carbon steel pipes are measured. When the reduced weight when no corrosion inhibitor is added is designated by $W_O$, and that when the corrosion inhibitor is added by W, the percent corrosion inhibition can be calculated according to the following formula:

$$(W - W_O/W_O) \times 100 \, (\%)$$

Figure 4:
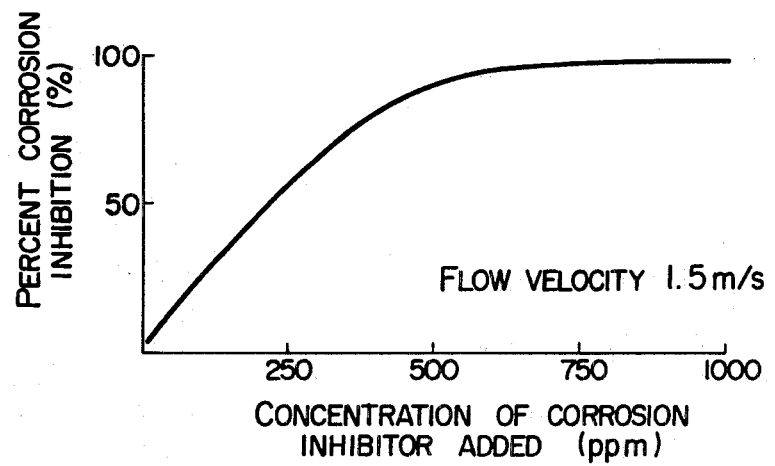
FIG. 4 is a graph showing an effect of corrosion prevention on the surfaces of capsules.

It is seen from FIG. 3 that a percent corrosion inhibition of 85% is obtained at a concentration of the corrosion inhibitor of 150 ppm (0.015%) by weight. The carbon steel capsules are taken out of the fluid and left in the atmosphere for three hours a day, and a percent corrosion inhibition is determined likewise in the same manner as above. The results are shown in FIG. 4.

When hexamethylenetetramine is used in place of dicyclohexylammonium nitrite, a similar good effect upon the corrosion inhibition is obtained.

In the present method for corrosion prevention, cheap carbon steel pipe line and capsules can be used, and the method itself is much simplified, reducing in the transportation facility cost, facilitating its maintenance and increasing a transportation efficiency. Thus, the transportation cost is lowered in the present invention.

What is claimed is:

1. A method for preventing erosion-corrosion of a hydraulic metallic capsule transportation apparatus, which comprises depositing straight chain, macromolecular polyethylene oxide having a molecular weight larger than $10^4$ directly onto surfaces of metallic capsules to be introduced into a fluid in a pipe line, thereby reducing a fluid resistance of the metallic capsules and reducing damages due to contact of the metallic capsules with inner walls of the pipe line, adding a corrosion inhibitor to the fluid in the pipe line, said corrosion inhibitor containing an inorganic nitrite and a compound selected from the group consisting of dicyclohexylammonium nitrite and hexamethylene tetramine, thereby protecting the inside walls of the pipe line and the surfaces of the metallic capsules from corrosion, and depositing the corrosion inhibitor at a higher concentration onto the surfaces of the metallic capsules after a material to be transferred is discharged from the metallic capsules but before the metallic capsules are exposed to the atmosphere, thereby protecting the metallic capsules from corrosion in the atmosphere.

2. A method according to claim 1, wherein the corrosion inhibitor is a mixture of an inorganic nitrite and dicyclohexylammonium nitrite.

3. A method according to claim 1, wherein the corrosion inhibitor is a mixture of an inorganic nitrite and hexamethylene tetramine.

4. A method according to claim 1, wherein the polyethylene oxide is at a concentration of 0.1 to 10% by weight, and the mixture of the inorganic nitrite and the compound selected from the group consisting of dicyclohexylammonium nitrite and hexamethylene tetramine is at a mixing ratio of the former to the latter of 3:2 and a concentration of 0.015 to 1.5% by weight based on the fluid, and, as the corrosion inhibitor to be deposited onto the surfaces of the metallic capsules before the exposure to the atmosphere, at a mixing ratio of the former to the latter of 1:4 and a concentration of above 1.5% by weight.

5. A method according to claim 1, wherein the metallic capsules, after having had said higher concentration of said corrosion inhibitor deposited on them, are stored and later recycled in said fluid, to be refilled with a material to be transported.

6. A method according to claim 1, wherein the corrosion inhibitor added to the fluid is 0.015 to 1.5% by weight on the basis of the fluid, and the ratio of the inorganic nitrite to the compound selected from dicyclohexylammonium nitrite and hexamethylene tetramine is 3:2.

7. A method according to claim 1, wherein the corrosion inhibitor deposited on the surfaces of the metallic capsules is at a concentration of above 1.5% by weight and the ratio of the inorganic nitrite to the compound selected from the group consisting of dicyclohexylammonium nitrite and hexamethylene tetramine is 1:4.

8. A method according to claim 1, wherein the corrosion inhibitor added to the fluid is 0.015 to 1.5% by weight on the basis of the fluid.

9. A method according to claim 1, wherein the corrosion inhibitor deposited on the surfaces of the metallic capsules is at a concentration greater than 1.5% by weight.

10. A method according to claim 2, wherein the inorganic nitrite is sodium nitrite.

11. A method according to claim 1, wherein the polyethylene oxide is in an aqueous solution at a concentration of 0.1 to 10% by weight.

* * * * *